Figure 1:
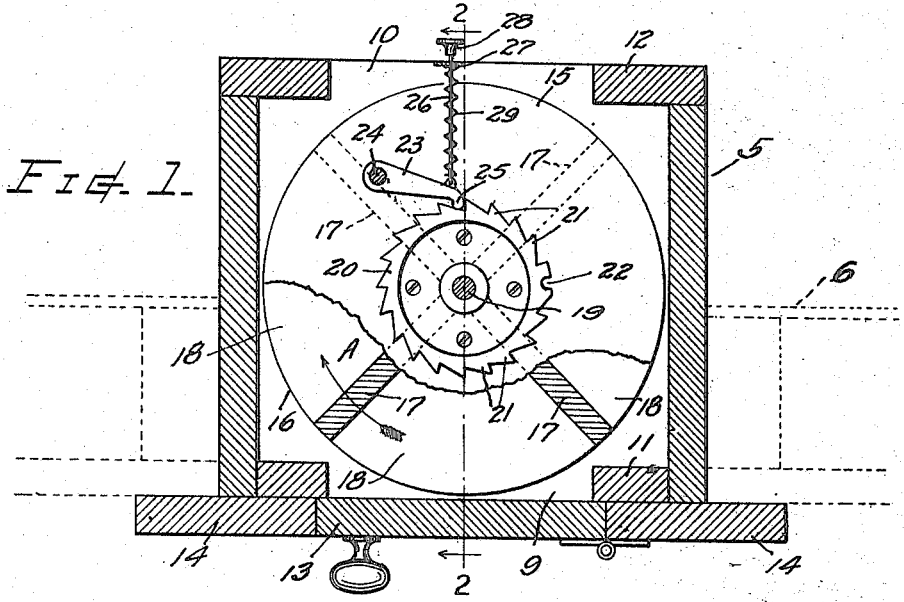

Nov. 18, 1924.

F. M. BARNES

SERVICE CABINET

Filed Sept. 15, 1922

1,515,922

INVENTOR:
F. M. Barnes
BY
Pierre Barnes
ATTORNEY

Patented Nov. 18, 1924.

1,515,922

UNITED STATES PATENT OFFICE.

FREDERICK M. BARNES, OF SEATTLE, WASHINGTON.

SERVICE CABINET.

Application filed September 15, 1922. Serial No. 588,311.

*To all whom it may concern:*

Be it known that I, FREDERICK M. BARNES, a citizen of the United States, residing at Seattle, in the county of King and State of Washington, have invented certain new and useful Improvements in Service Cabinets, of which the following is a specification.

This invention relates to service cabinets which are designed to be used in the walls of dwellings or the like for receiving merchandise.

The object of my invention is the improvement of devices of this character to render the same more convenient in use and to safeguard the contents from being removed surreptitiously.

The invention consists in the novel construction, combination and arrangement of parts hereinafter described, illustrated in the accompanying drawing, and pointed out in the appended claims.

In the drawing,—

Figure 2:
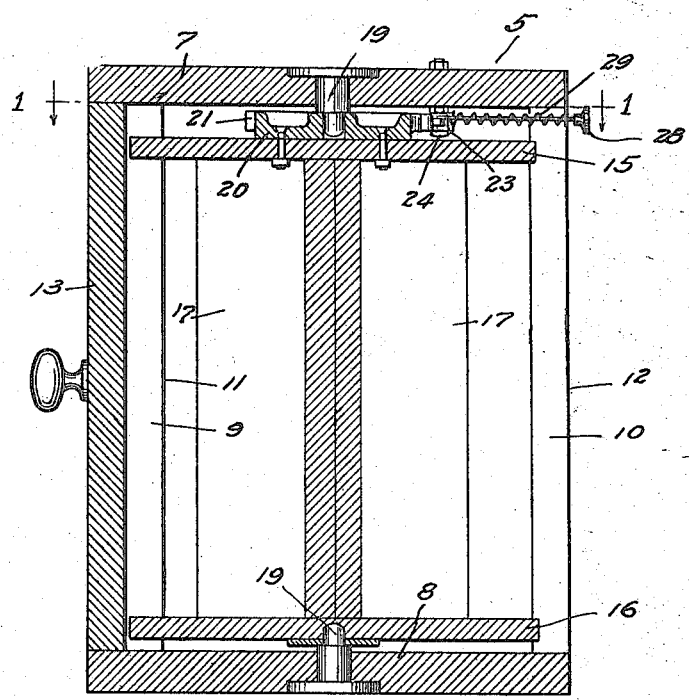

Figure 1 is a view, partly in plan and partly in horizontal section of devices embodying my invention, said section being taken on line 1—1 of Fig. 2, and the rotary conveyor member being shown partly broken away. Fig. 2 is a longitudinal vertical section taken substantially on line 2—2 of Fig. 1.

The numeral 5 designates a casing of rectangular shape, preferably, designed to be inserted in a wall, denoted by dotted lines 6, of a dwelling house. Said casing is provided with a top wall 7, a bottom wall 8 and an outside opening 9 and an inside opening 10 in the front and back walls 11 and 12 respectively. A door 13 is desirably provided for closing the opening 9 of said front wall and may be hingedly connected thereto or, as shown in Fig. 1, to facing boards such as 14.

Provided within the casing is a rotary conveyor comprising a circular top element 15, and a circular bottom or shell element 16 of diameters slightly less than the internal width of the casing, and a plurality of radially disposed partitions 17 dividing the space between said top and shelf elements into a number of sector shaped compartments.

Said conveyor is mounted for rotary movements about an axis extending vertically through the center of the same as by the provision of gudgeons 19 rigidly secured to the casing and journaled in socket plates provided on the conveyor.

Rigidly secured to the conveyor and concentric with the axis thereof is a wheel 20 having in its periphery a series of ratchet teeth 21 arranged as shown and is also provided with a notch 22 of substantially the form in which it is represented in Fig. 1. 23 represents an arm pivotally connected to a stud 24 depending from the top wall 7 of the casing, said arm serving as a dog with respect to the ratchet teeth. The free end of the dog is formed to afford a bill 25 adapted to engage in the notch 22. 26 is a rod attached to the dog and extending through an aperture of a plate element 27 of the casing and with an operating knob or handle 28 at its outer end.

A spring 29, preferably, surrounding the rod 26 between the plate 27 and the dog acts to yieldingly retain the latter in engaged relations with respect to the ratchet teeth and tending to urge the bill 25 of the dog into the notch 22 when the same is brought into register with said bill in each rotation of the conveyor. With the ratchet teeth arranged as shown, said dog permits the conveyor to be rotated only in the direction indicated by the arrow A until the dog engages in the notch 22, whereupon the conveyor is locked against movements in either rotary direction. The dog is withdrawn from said notch through the medium of the rod 26.

In practice, the housewife would ordinarily regulate the conveyor to have the ratchet wheel 20 occupy approximately the rotary position in which it is represented in Fig. 1. A person after making a delivery of goods through opening 9 into the compartment thereat removes said compartment from in front of the opening 9 by rotating the conveyor in the direction of the arrow A until the next succeeding compartment is presented to such opening.

This compartment may then be supplied with goods by a second party making a delivery who, in turn, rotates the conveyor to remove his goods from the opening 9 and present another compartment to said opening. Such turnings of the conveyor can be repeated until the dog engages in the notch 22. With the dog thus engaged the conveyor cannot be further rotated to permit removal through opening 9 of the goods from any of the compartments which have been revolved from said opening. The housewife, however, from the inside of the apartment, by simply withdrawing the dog 23 from its locked relations with the conveyor, turns the latter in either rotary direction selectively to remove the contents of any of the compartments.

While I have illustrated the invention embodied in an efficient device, I do not wish to be understood as limiting myself to the specific construction hereinbefore described, as changes may be made in the details thereof without departing from the invention as defined in the following claims.

What I claim, is,—

1. A service cabinet comprising a casing having openings in opposite sides thereof, a conveyor mounted for rotation in said casing, a dog controlled from one side only of the casing whereby the conveyor is rotatable in one direction or in two directions, selectively, and means provided on the conveyor and engageable by said dog to prevent the conveyor being turned in either direction from a predetermined rotary position.

2. A service cabinet comprising a casing having openings in the front and rear sides thereof, a conveyor mounted for rotation in said casing, said conveyor being provided with a plurality of compartments, a ratchet wheel rigid with the conveyor, a dog connected to the casing and engageable with said ratchet wheel to afford movement of the conveyor in but one rotary direction, said ratchet wheel being provided with a device which is engageable with said dog for securing the conveyor against movement in either rotary direction, and means controlled from one side of the casing to render said dog temporarily inoperative with respect to said device whereby the conveyor may be turned in either rotary direction.

3. A service cabinet comprising a casing having openings in opposite sides thereof, a conveyor mounted for rotation in said casing, said conveyor being provided with a plurality of compartments, a spring actuated dog attached to the casing, a ratchet wheel provided upon the conveyor whereby said dog serves to normally permit motion of the conveyor in but one rotary direction, and means engageable by said dog for locking the conveyor against being turned in either rotary direction, and a device controlled from one side of the casing for temporarily rendering said dog inoperative with respect to the ratchet wheel and said means.

Signed at Seattle, Washington, this 15th day of August 1922.

FREDERICK M. BARNES.

Witnesses:
PIERRE BARNES,
MARGARET G. SUPPLE.